Aug. 14, 1951          D. F. MURPHY          2,564,209

EXPLOSIVE OPERATED MOTOR FOR RIP CORD

Filed Jan. 25, 1950          2 Sheets-Sheet 1

INVENTOR
*Donald F. Murphy*

BY *Robert F. Peck*

ATTORNEY

Aug. 14, 1951
D. F. MURPHY
2,564,209
EXPLOSIVE OPERATED MOTOR FOR RIP CORD
Filed Jan. 25, 1950
2 Sheets-Sheet 2
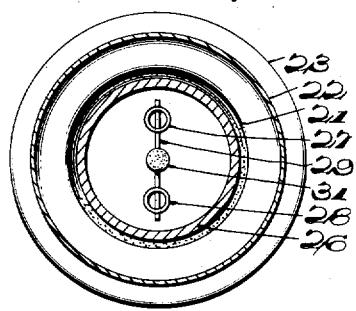
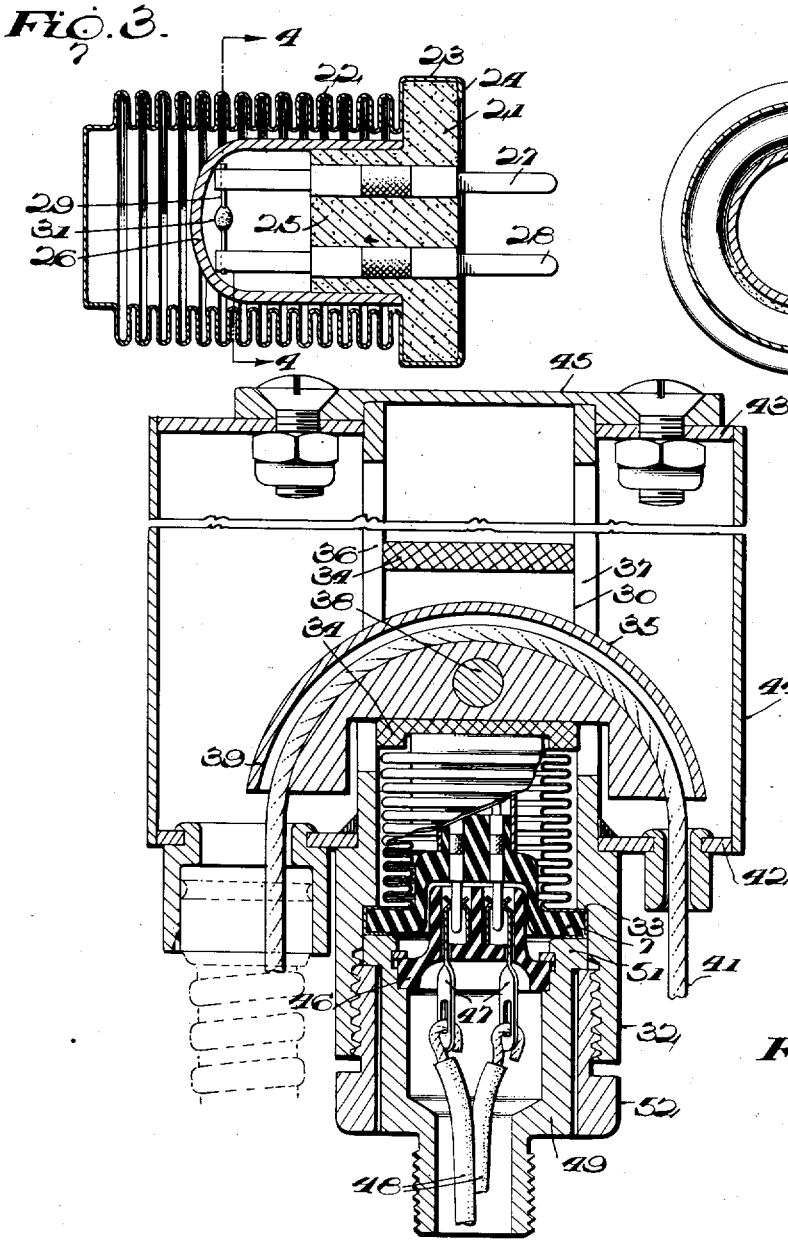
INVENTOR
Donald F. Murphy.
BY Robert F. Peck.
ATTORNEY Patented Aug. 14, 1951

2,564,209

UNITED STATES PATENT OFFICE 2,564,209

EXPLOSIVE OPERATED MOTOR FOR RIP CORD

Donald Francis Murphy, Baltimore, Md., assignor to Bendix Aviation Corporation, Baltimore, Md., a corporation of Delaware Application January 25, 1950, Serial No. 140,520

7 Claims. (Cl. 244—149)

This invention relates to improvements in the design of explosive devices of the type wherein an expansible bellows confines an explosive powder charge and is adapted to be expanded upon ignition of the powder charge, the forces of explosion being sufficient to expand the bellows, but insufficient to cause rupture thereof, whereby the gases and residue resulting from explosion are confined within the bellows. The improvements achieved result in a unitary, rugged, and compact device suitable for large quantity manufacture at low cost and having features of design permitting ease and flexibility of use.

Heretofore, devices of this type were made up of an assembly of a number of different parts, the parts requiring a substantial number of machining operations to permit same to be properly assembled. Moreover, a grounded system was used wherein the base of the device constituted one electrode and carried therein, insulated therefrom, the other electrode. Additionally, cumbersome threaded parts requiring wrenches for tightening were used to lock the device in an actuating mechanism. Such a device is shown in U. S. Patent No. 2,504,148 issued April 18, 1950. The present invention is directed to improvements in the device shown in the Ogden et al. application. The improvements have resulted in a reduction of the number of parts, a reduction in the manufacturing operations required, the substitution of a two-wire electrical system permitting the use of more simple and positive electrical connections to an external source of supply, a reduction in size and weight, all of which result in a very compact assembly capable of being manufactured at low costs and capable of being used in a variety of applications with a maximum of ease.

The invention will be more clearly understood by reference to the drawings annexed hereto in which:

Fig. 3 is a cross-sectional view of another embodiment of the invention;

Fig. 4 is a view taken along the lines 4—4 in Fig. 3; and

Fig. 5 is a view, partially in section, showing the manner in which the embodiment disclosed in Fig. 1 can be used in conjunction with an automatic parachute opening device.

Figure 2:
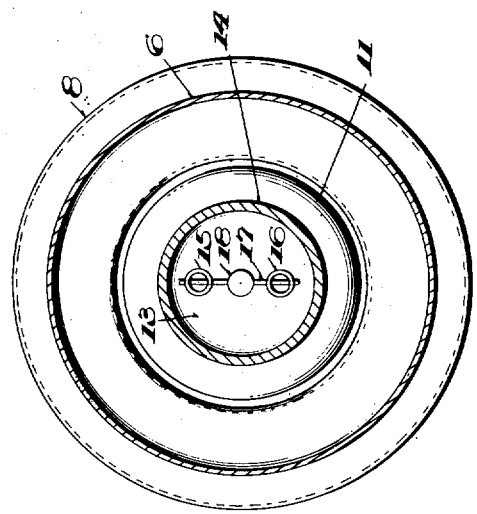
Fig. 2 is a view taken along the lines 2—2 in Fig. 1.
Figure 1:
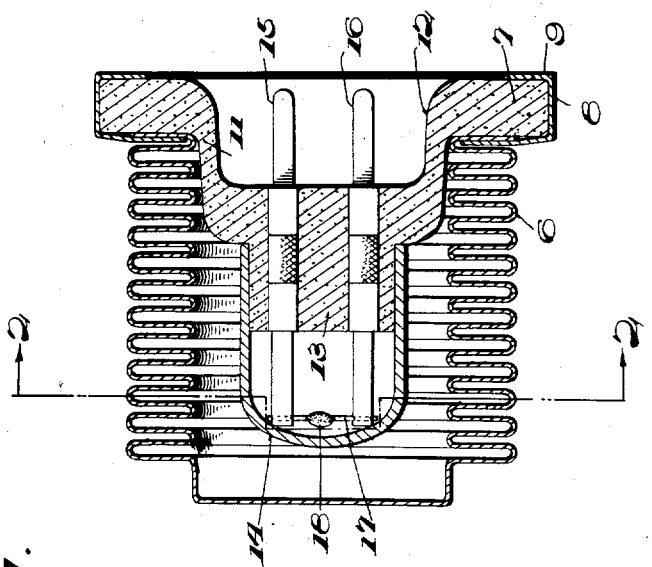
Fig. 1 is a cross-sectional view of one embodiment of the invention.

Referring now to Fig. 1, it is seen that the device comprises substantially a two-part assembly of a flexible metallic bellows 6 and a molded plastic base 7. The bellows 6 has rigidly secured to its open end, as by brazing or soldering, the annular shoulder member 8 for receiving the base 7 therein. Although the bellows 6 and shoulder member 8 are shown as comprising a two-part assembly, the combination could be achieved by a single part; however, except for relatively small diameter bellows, it is less expensive to make up the combination from two separate parts. The outer edges 9 of the shoulder 8 are rolled over to rigidly secure the base 7 to the bellows 6. A coating of sealing compound may be applied to the junction of edge 9 and base 7.

The base 7 has a centrally disclosed portion 11 of reduced diameter, which projects into the interior of the bellows 6. The base 7 is cut away on its outer side to form the centrally disposed recess 12. The inner extremity 13 of the portion 11 is reduced further in diameter and serves as a support for the frangible cap 14 which may be suitably affixed to the extremity 13. The base 7 is provided with a pair of electrodes 15, 16, which extend from both faces thereof. The inner and outer extremities of the electrodes 15, 16, are of slightly reduced diameter and the interior portions of the electrodes 15, 16 may be roughened or knurled throughout a portion of the length to provide a positive mounting within the base. Normally, base 7 comprises a waterproof thermosetting plastic material and the electrodes 15, 16 are securely affixed to the base during the molding of same.

The outer extremities of the electrodes 15, 16, do not project beyond the outer face of the base 7. That is to say, they lie wholly within the recess 12. Thus, a compact cartridge-type device is achieved, having no parts protruding or extending beyond the outer surface of base 7.

The inner extremities of the electrodes 15, 16 have a filament 17 bridging their gap, to which is affixed a priming bead 18. A suitable powder charge can be placed within the cap 14, and is compacted therein so as to surround the electrodes 15, 16 and substantially fill up the volume confined by the cap 14. The outer extremities of the electrodes 15, 16 are adapted to be connected to a source of electrical energy through suitable switching means and, upon closure of the circuit and consequent application of energy to the electrodes, a current will flow through the electrodes by reason of the filament 17 bridging the gap between their inner extremities. The filament 17 is selected to provide a high electrical resistance so that passage of current therethrough will cause a substantial degree of self-heating. The filament 17 will continue to heat until the priming bead 18 ignites, which in turn causes the powder confined within the cap 14 to ignite and explode. The cap 14 is readily disintegrated by the explosion of the powder contained within and permits the explosive gases generated to flow into the interior of the bellows 6. Ordinarily, the base 7 of the device is rigidly secured with respect to a fixed support, so that the forces generated by the explosive gases will react upon the inner end of the bellows 6 in such a manner as to expand the bellows to its permissible length. Thus, it is seen that the bellows 6 is readily expanded by explosion of the powder charge confined therein. Because the bellows 6 and base 7 are rigidly secured together, all of the explosive gases, any flame or heat flashes, and all of the residue resulting from the explosion are confined within the bellows. As is known in the art of automatic parachute opening devices, such a construction is ideal, so that the parts and materials associated with the explosive device are not injured or damaged by the resulting flame and explosion.

In Fig. 3, the embodiment shown therein is substantially the same as that shown in Fig. 1, except for the fact that the recess 12, shown in Fig. 1, has been eliminated and the bellows and its base retaining rim are in one piece. Thus, in Fig. 3, the base 21 has affixed thereto the flexible metallic bellows 22, the open end of the bellows (retaining rim) forming an annular shoulder 23, the outer edges 24 of which are rolled over on the outer face of the base 21. A suitable sealing compound may be applied at the junction of edges 24 and base 21. The base 21 has an inner portion 25 of reduced diameter, and this portion 25 forms a support for a frangible cap 26. A pair of electrodes 27, 28 are carried by the base 21 and affixed thereto in a manner as described in connection with the embodiment shown in Fig. 1. The inner extremities of the electrode 27, 28 are bridged by a filament 29, which has a high value of electrical resistance and upon connection of the outer extremities of electrode 27, 28 with a source of electrical energy, the current passing through the filament 29 causes same to heat, which in turn results in ignition of the priming bead 31, which causes the powder charge confined within cap 26 to ignite and explode, and thereby expand the bellows 22 to its permissible length. The operation of the embodiment shown in Fig. 3 is identical with the operation of the embodiment shown in Fig. 1. Ordinarily, the embodiment shown in Fig. 3 is useful, for applications requiring a generally smaller explosive device.

In both embodiments of the invention, the priming bead and powder charge are sulphur base materials characterized by a very rapid burning rate. The caps confining the bead and charge may be acetate material, and a 1-volt source of electrical energy will provide sufficient power for energization of the device. The embodiment shown in Fig. 1 may have a bellows diameter on the order of ¾" and a total possible elongation of two inches. With such an arrangement, and the proper selection of the quantity and type of powder charge utilized therewith, a force of 100 pounds can be developed for one inch of elongation. In Fig. 3, the bellows diameter may be on the order of one-half inch, with a total possible elongation of one inch. In this embodiment, with the proper selection of quantity and type of powder charge, a force of 150 pounds can be developed for three-eighths of an inch elongation.

In Fig. 5, there is shown a portion of an automatic parachute opening device adapted to be actuated by the embodiment of the invention shown in Fig. 1. Thus, there is shown a barrel 32 having a bore which in turn, has the annular shoulder 33, upon which the outer extremity of base 7 rests. The bellows 6 projects into the bore 30 and rests against a piston 34, which is rigidly secured to a pulley 35 by means of guide pin 38. A pair of slots 36, 37 in the barrel 32 permit the pulley 35 to move therein. The pulley 35 has an arcuate slot 39 through which passes a flexible cable 41, one end of which may be suitably clamped in a fixed position with respect to barrel 32, the other end of which may be affixed to the ripcord of a parachute. The barrel 32 has a pair of plates 42, 43 suitably affixed, as by brazing, to its inner and outer extremities, respectively, to which are secured a side member 44 and top 45, all of which provide a compact housing for the device.

Cooperating with the projecting electrodes 15, 16 of the explosive device, there is a conventional type of electrical socket 46 having a pair of apertures for receiving therein the electrodes 15, 16. Suitable spring clips 47 are located within the apertures to firmly grip the electrodes 15, 16 and provide good electrical contact therebetween. The spring clips 47 extend from the socket 46 and are connected to a pair of electrical leads 48 which, in turn, are adapted to be connected to a source of electrical energy through suitable switching arrangements. The socket 46 is carried by a breech member 49 whose inner extremity takes the form of an annular flange 51, one surface of which is adapted to abut against the outer face of the base 7. Surrounding the breech 49 is a lock-nut 52 which cooperates with threads provided in the outer extremity of bore 32. The lock-nut 52 is adapted to be inserted into barrel 32 and screwed therein until the breech and base 7 are tightly clamped into the bore 30.

With the above arrangement of parts in mind, it is seen that the base 7 of the explosive device is rigidly fixed with respect to barrel 32, and upon explosion, the inner end of bellows 6 will travel inwardly, carrying with it the piston 34 and its associated pulley 35, which in turn will exert a force on the cable 41, thereby opening the parachute associated therewith.

It is to be noted that in both embodiments of the invention, the base members 7 and 21, respectively, may be formed of a water-proof plastic material having electrical insulating properties and easily molded into the shape and configuration desired. In the form of the device shown in Fig. 1, the recess 12 provides a complementary portion of the base 7 for insertion therein of the socket 46. In either embodiment of the invention, the explosive device can be readily and easily slipped into a bore and clamped thereto by simplified breeching arrangements, not requiring any awkward wrenching operations.

What is claimed and desired to be secured by United States Letters Patent is:

1. In an explosive device, in combination: an annular base member having a centrally disposed portion of reduced diameter, said base member being composed of an insulating material; a pair of spaced electrodes carried by said base member and extending axially therein, whereby the extremities of said electrodes extend outwardly from opposite faces of said base; a conductive filament carried by the inner extremities of said conductive pair, said filament having a priming bead secured thereto; a frangible hollow cap secured to said base member, said cap having its open end surrounding the centrally disposed portion of said base member; a powder charge confined within the volume defined by said cap and base member; a flexible metallic bellows surrounding said centrally disposed portion and having a closed end and an open end, said bellows being adapted to expand under influence of the forces generated by ignition of said powder charge said open end having the configuration of an annular shoulder for receiving said base member therein, the outer edges of said open end of said bellows being rolled over on the outer side of said base member, whereby an integral assembly is achieved.

2. The combination defined in claim 1, wherein said base and said electrodes comprise an integral assembly formed by molding a water-proof thermosetting plastic material around said electrodes.

3. The combination defined in claim 2, wherein a sealing compound is applied to the junction of the outer side of said base member and the rolled-over edge of said bellows.

4. The combination defined in claim 3, wherein the outer side of said base has a centrally disposed recess surrounding said electrodes, and the exposed extremities of said electrodes extend from said recess, but do not extend beyond said outer side.

5. The combination defined in claim 4, wherein an electrical socket is provided to receive the exposed end of said electrodes, said socket having a configuration complementary to the configuration of the outer side of said base.

6. In an explosive device, in combination: an annular base; a flexible metallic bellows having an open end and a closed end, said open end being rigidly and hermetically secured to said base; powder charge force generating means within said bellows and carried by said base; and powder charge igniting means within said bellows and carried by said base, said bellows being adapted to expand under influence of the forces generated by ignition of said powder charge and said last-named means comprising a pair of electrodes extending in an axial direction through said base on both sides thereof; insulating means surrounding said electrodes, a conductive filament bridging the inner extremities of said electrodes, and a priming bead affixed to said filament.

7. The combination defined in claim 6, wherein the outer side of said base has a centrally disposed recess surrounding said electrodes, and the exposed extremities of said electrodes extend from said recess, but do not extend beyond said outer side.

DONALD FRANCIS MURPHY.

REFERENCES CITED

The following references are of record in the file of this patent:

UNITED STATES PATENTS

| Number | Name | Date |
|---|---|---|
| 1,660,713 | Kauch | Feb. 28, 1928 |
| 1,892,050 | Goss | Dec. 27, 1932 |
| 1,933,694 | Allen | Nov. 7, 1933 |
| 2,393,629 | Grant | Jan. 29, 1946 |

FOREIGN PATENTS

| Number | Country | Date |
|---|---|---|
| 585,265 | Great Britain | Feb. 3, 1947 |